United States Patent [19]

Sanderson

[11] Patent Number: 4,892,021

[45] Date of Patent: Jan. 9, 1990

[54] VARIABLE ANGLE SAW GUIDE APPARATUS

[76] Inventor: Jeffrey A. Sanderson, 5245 Bluestem Dr., Colorado Springs, Colo. 80917

[21] Appl. No.: 296,266

[22] Filed: Jan. 12, 1989

[51] Int. Cl.⁴ .............................................. G27B 27/06
[52] U.S. Cl. ..................................... 83/468; 83/471.2; 83/581; 269/303
[58] Field of Search ................. 83/467 R, 468, 471.2, 83/473, 477, 574, 581, 455, 743, 486, 486.1; 269/303, 304, 900, 315

[56] References Cited

U.S. PATENT DOCUMENTS

| | | | |
|---|---|---|---|
| 1,785,044 | 12/1930 | Nickels | 83/468 |
| 3,344,819 | 10/1967 | Mitchell | 83/467 X |
| 3,623,516 | 11/1971 | Kirk | 83/581 |
| 3,841,188 | 10/1974 | Wiater | 83/471.3 |
| 3,842,700 | 10/1974 | Novak | 83/743 |
| 3,941,020 | 3/1976 | Huntley et al. | 83/468 |
| 4,024,783 | 5/1977 | Sturgis | 83/468 |
| 4,350,066 | 9/1982 | Volk | 83/574 X |
| 4,519,280 | 5/1985 | Cook | 83/743 X |

*Primary Examiner*—Frank T. Yost
*Assistant Examiner*—Eugenia A. Jones
*Attorney, Agent, or Firm*—Henderson & Sturm

[57] ABSTRACT

A variable angle saw guide apparatus (10) for assisting an individual in making a precision cut in a piece of lumber (100) with a saw (300); wherein the three major components of the apparatus (10) include an angle plate unit (11) having a plurality of angle defining apertures (18); an angle guide unit (12) adapted to be secured to the angle plate unit (11) and aligned with a selected one of the angle defining apertures (18) via securing means (50); and, a hold down clamp unit (13) adapted to be secured to the angle guide unit (12) and engage the top of a piece of lumber (100) during the cutting process.

1 Claim, 1 Drawing Sheet

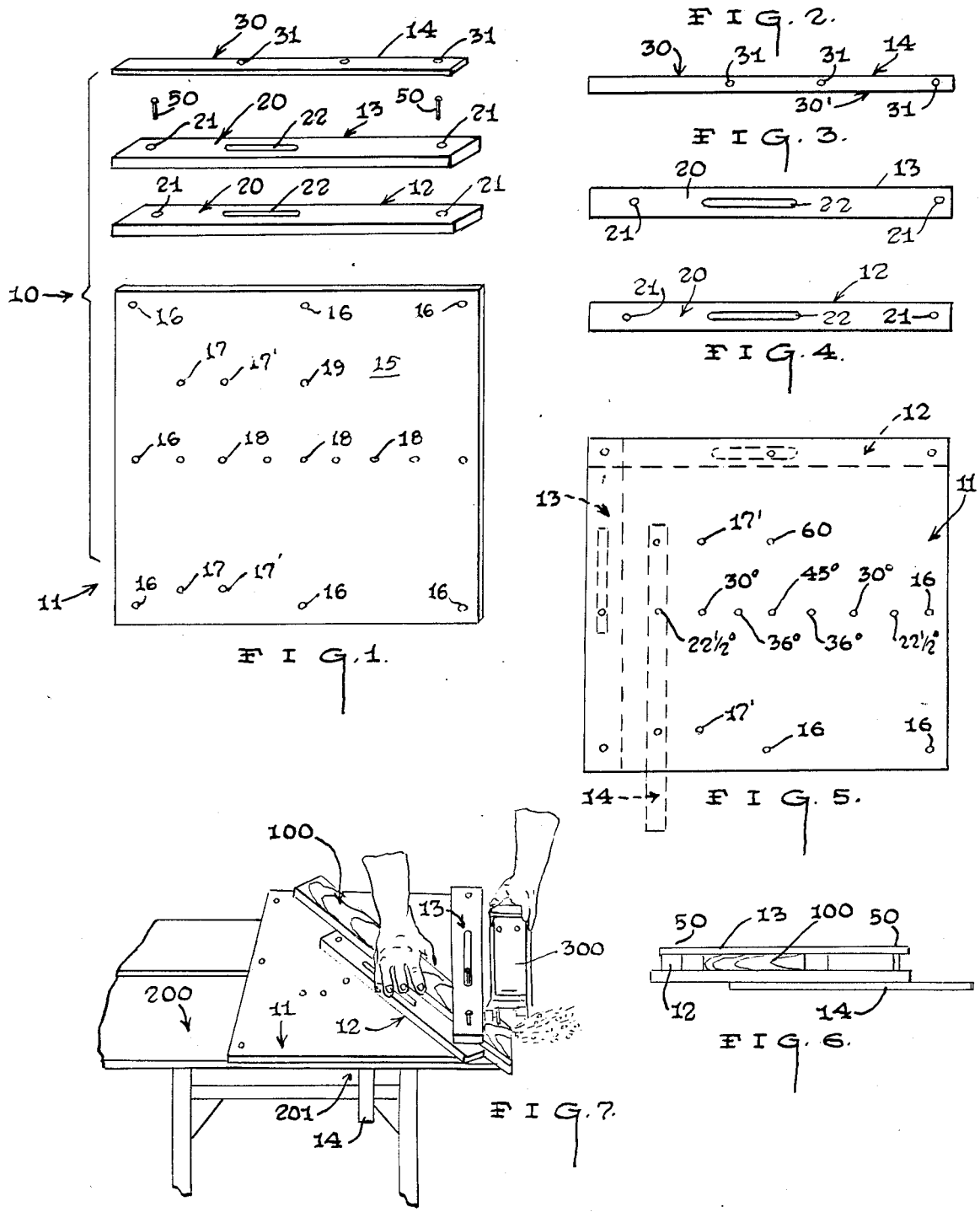

VARIABLE ANGLE SAW GUIDE APPARATUS

TECHNICAL FIELD

This invention relates to the field of saw guides in general, and more particularly to a variable angle saw guide apparatus.

BACKGROUND OF THE INVENTION

This invention was the subject matter of Document Disclosure Program Registration No. 195081, which was filed in the U.S. Patent and Trademark Office on June 16, 1988.

As can be seen by reference to the following U.S. Pat. Nos.: 4,024,783; 3,941,020; 3,842,700; and, 3,623,516 the prior art is replete with myriad and diverse saw guide devices.

While all of the prior art patented constructions are more than adequate for performing the basic purpose and function for which they have been specifically designed, these devices are also deficient in a number of different respects.

To begin with, the aforementioned prior art constructions are unduly complex, cumbersome, and in most instances particularly suited to only one of a variety of power and/or manual saws. In addition, the vast majority of these patented devices are too expensive for the weekend carpenter, woodworker or hobbyist due to their structural complexity.

As a consequence of the foregoing situation there has existed a longstanding need among those familiar with this type of a device for a simple, straightforward variable angle saw guide apparatus that would be very easy to operate and which could be used in conjunction with a wide variety of both powered and manual saws; and, the provision of such an arrangement is a stated objective of the present invention.

SUMMARY OF THE INVENTION

Briefly stated, the variable angle saw guide apparatus that forms the basis of the present invention comprises in general: an angle plate unit; an angle guide unit; a hold down clamp unit; and, an auxiliary table saw guide unit.

As will be explained in greater detail further on in the specification the angle plate unit comprises a generally square thin flat plate member having a plurality of mounting apertures and a plurality of angle adjustment apertures.

The angle guide unit comprises in general: an elongated thin flat rectangular guide arm member having a plurality of mounting apertures and at least one elongated slotted aperture; wherein, the mounting apertures are dimensioned to receive securing members and the elongated slotted aperture is dimensioned to receive an angle adjustment member to selectively vary the disposition of the angle guide unit both with respect to the angle plate unit and a piece of lumber that is to be cut by a saw blade.

The hold down clamp unit comprises in general: an elongated thin flat clamp member that is adapted to be operatively connected to the angle guide unit and brought into captive engagement with a piece of lumber that is held between the angle plate unit and the hold down clamp unit during the process of cutting the lumber.

The auxiliary table saw guide unit is employed in those instances wherein the apparatus is used in conjunction with a table saw having one or more channels formed parallel to the saw opening. In this particular situation the table saw guide unit is secured to the bottom of the angle plate unit and comprises an apertured slat member that is dimensioned to be slidingly received in a selected channel in the top of the table saw.

BRIEF DESCRIPTION OF THE DRAWINGS

These and other objects, advantages and novel features of the invention will become apparent from the detailed description of the best mode for carrying out the preferred embodiment of the invention which follows; particularly when considered in conjunction with the accompanying drawings, wherein:

FIG. 1 is an exploded perspective view of the variable angle saw guide apparatus of this invention;

FIG. 2 is an isolated top plan view of the auxiliary table saw guide unit;

FIG. 3 is an isolated top plan view of the hold down clamp unit;

FIG. 4 is an isolated top plan view of the angle guide unit;

FIG. 5 is an isolated top plan view of the angle plate unit;

FIG. 6 is an end view of the assembled apparatus; and,

FIG. 7 is a perspective view of the apparatus in use.

BEST MODE FOR CARRYING OUT THE INVENTION

As can be seen by reference to the drawings and in particular to FIG. 1, the variable angle saw guide apparatus that forms the basis of the present invention is designated generally by the reference numeral (10). The apparatus (10) comprises in general: an angle plate unit (11); an angle guide unit (12); a hold down clamp unit (13); and, an auxiliary table saw guide unit (14). These units will now be described in seriatim fashion.

As can best be seen by reference to FIGS. 1 and 5, the angle plate unit (11) comprises a generally rectangular relatively thin flat plate member (15) having a plurality of mounting apertures (16) disposed at spaced locations around the periphery of the plate member. In addition, the plate member (15) is further provided with spaced pairs (17)(17') of auxiliary saw guide attachment apertures; and, a plurality of aligned angle defining apertures (18) disposed along the middle of the plate member (15); as well as at least one additional angle defining aperture (19) offset from the other aligned angle defining apertures (18).

As shown in FIGS. 1 and 5, the generally rectangular relatively thin flat plate member (15) of the preferred embodiment is provided with a square configuration; and, the plurality of aligned angle defining apertures (18) define a plurality of the more commonly employed cutting angles used in carpentry and woodworking; wherein said plurality of angles include but are not limited to the following angles as viewed from left to right in FIG. 5: 22½°, 30°, 36°, and 45°. Furthermore, at least one angle defining aperture (19) defines at least one other commonly employed cutting angle used in carpentry and woodworking which is 60°.

Turning now to FIGS. 1, 3 and 4, it can be appreciated that both the angle guide unit (12) and the hold down clamp unit (13) comprise the same general construction, with the main distinction between the two units (12) and (13) being the fact that: the angle guide unit (12) will always be in contact with the angle plate unit (11); while the hold down clamp unit (13) will always be disposed above the angle guide unit (12); such that at least a portion of the angle guide unit (12) will always be disposed intermediate the angle plate unit (11) and the hold down clamp unit (13).

Since both the angle guide unit (12) and the hold down clamp unit (13) are virtually identical, like reference numerals will be used to describe these units. To wit, both units (12) and (13) comprise an elongated generally rectangular arm member (20) having a pair of mounting apertures (21) disposed proximate the ends of the arm member (20), and an elongated slot (22) formed off-set with respect to the mid-point of the arm members (20).

Turning now to FIG. 2 it can be seen that the auxiliary table saw guide unit (14) comprises an elongated generally thin slat member (30) having a plurality of mounting apertures (31) disposed proximate the middle and one end (30') of the slat members (30). In addition, as can be seen by reference to FIGS. 1, 6 and 7, the variable angle saw guide apparatus (10) is further provided with a plurality of securing members (50) that operatively secure the auxiliary table saw guide unit (14), the angle guide unit (12) and the hold down clamp unit to the angle plate unit (11) as will be explained presently.

As mentioned previously the variable angle saw guide apparatus (10) was developed to assist a person to accurately employ a saw implement (300) to cut a piece of lumber (100) at a precise angle using non-commercial or home craftsman type saws (300) which are not equipped with either precision angle adjustment mechanisms or clamping devicess which will immobilize a workpiece during a cut.

As can best be appreciated by reference to FIGS. 5 thru 7, the apparatus (10) of this invention performs the aforementioned desired functions in the following manner. To begin with, the angle guide unit (12) is installed on the angle plate unit (11) such that the angle guide unit (12) is disposed at a selected angle relative to one edge of the angle plate unit (11). Then the hold down clamp unit (13) is disposed over both a portion of the angle guide unit (11) and a piece of lumber (100); whereupon, the hold down clamp unit (13) is subsequently brought into frictional engagement with the top of the piece of lumber (100) while the hold down clamp unit (13) is operatively engaged with both the angle plate unit (11) and the angle guide unit (12) via the securing members (50).

It should also be appreciated at this juncture that in some instances the hold down clamp unit (13) will also function as a saw blade guide as illustrated in FIGS. 5 thru 7, while in other instances the angle plate unit (11) will abut a barrier (not shown) on a table saw (200); wherein, the hold down clamp unit (13) will serve primarily to captively engage a piece of lumber (100) relative to the angle plate unit (11).

As can also be appreciated by reference to FIGS. 5 thru 7, in those instances wherein a table saw (200) is provided with one or more channels (201) disposed parallel to a saw blade; the auxiliary table saw guide unit (14) may be installed in a selected position beneath the angle plate unit (11), such that the auxiliary table saw guide unit (14) will slidingly engage one of the channels (201) in the top of the table saw (200) to facilitate the cutting process in a well recognized manner.

With the variable angle saw guide apparatus (10) of this invention is now possible for an individual equipped with any type of a saw (300) such as table saw, radial arm saw, jigsaw, circular saw, etc. to produce the following types of cuts: daddo cuts, end cuts, glue joint cuts, design cuts, bevel cuts, compound meter cuts, and shaper cuts to name but a few.

Having thereby described the subject matter of the invention, it should be obvious that many substitutions, modifications, and variations of the invention are possible in light of the above teachings. It is therefore to be understood that the invention as taught and described herein is only to be limited to the extent of the breadth and scope of the appended claims.

I claim:

1. A variable angle saw guide apparatus to assist an individual in cutting a piece of lumber at a precise angle using a saw wherein the apparatus consists of:

an angle plate unit comprising a generally rectangular relatively thin flat plate member having a plurality of mounting apertures disposed around the periphery of the plate member, and a plurality of angle defining apertures, including a plurality of aligned angle defining apertures and at least one additional angle defining aperture offset from said plurality of aligned angle defining apertures, an angle guide unit comprising a first elongated generally rectangular arm member having: a pair of mounting apertures disposed proximate the ends of the arm member; and, an elongated slot formed intermediate the ends of the arm member; wherein, the angle guide member is disposed in contact with the angle plate unit and a piece of lumber;

a hold down clamp unit operatively attached to said angle guide unit and said angle plate unit; wherein the hold down clamp unit comprises a second elongated generally rectangular arm member having mounting apertures formed proximate the ends of the second arm member, which is adapted to overlie at least a portion of both said first elongated generally rectangular arm member and said piece of lumber for captively engaging said piece of lumber against the plate member;

a plurality of securing members adapted to engage the angle guide unit and the hold down clamp unit to the angle plate unit wherein one of the plurality of securing members extends through at least one of the mounting apertures in the hold down clamp unit, the angle guide unit and the angle plate unit; and another of the plurality of securing members extends through the elongated slot in the first arm member and a selected one of the plurality of angle defining apertures; and, an auxiliary table saw guide unit including an elongated generally thin slat member which is adapted to be secured beneath said angle plate unit.

* * * * *